(12) United States Patent
Ottersland

(10) Patent No.: US 9,579,802 B2
(45) Date of Patent: Feb. 28, 2017

(54) GRIPPING DEVICE WITH ADJUSTABLE DIAMETER AND METHOD OF OPERATING

(71) Applicant: MHWIRTH AS, Kristiansand (NO)

(72) Inventor: Gjerulf Ottersland, Kristiansand (NO)

(73) Assignee: MHWIRTH AS, Kristiansand (NO)

( * ) Notice: Subject to any disclaimer, the term of this patent is extended or adjusted under 35 U.S.C. 154(b) by 0 days.

(21) Appl. No.: 14/893,078

(22) PCT Filed: May 20, 2014

(86) PCT No.: PCT/EP2014/060341
§ 371 (c)(1),
(2) Date: Nov. 23, 2015

(87) PCT Pub. No.: WO2014/187823
PCT Pub. Date: Nov. 27, 2014

(65) Prior Publication Data
US 2016/0121490 A1  May 5, 2016

(30) Foreign Application Priority Data

May 24, 2013  (NO) .................................... 20130726

(51) Int. Cl.
*E21B 19/06* (2006.01)
*B25J 15/00* (2006.01)
*E21B 19/14* (2006.01)
*E21B 19/15* (2006.01)

(52) U.S. Cl.
CPC ............ *B25J 15/0028* (2013.01); *E21B 19/06* (2013.01); *E21B 19/14* (2013.01); *E21B 19/155* (2013.01)

(58) Field of Classification Search
CPC ....... B25J 15/0028; E21B 19/06; E21B 19/14; E21B 19/155; B25B 5/064; B66C 1/427
USPC ................. 294/194, 198, 90, 907; 414/22.54
See application file for complete search history.

(56) References Cited

U.S. PATENT DOCUMENTS

| 2,964,020 A | | 12/1960 | Defibaugh | |
| 4,743,055 A | * | 5/1988 | Dantan | B25J 15/103 294/110.1 |
| 4,752,094 A | * | 6/1988 | Tabeau | B25J 15/0213 294/106 |
| 5,090,757 A | * | 2/1992 | Huber | B25J 13/08 294/119.1 |
| 5,340,182 A | * | 8/1994 | Busink | E21B 19/07 294/102.2 |

(Continued)

FOREIGN PATENT DOCUMENTS

| NO | 331630 B1 | 2/2012 |
| SU | 1763634 A1 | 9/1992 |
| WO | WO 02/074495 A1 | 9/2002 |

*Primary Examiner* — Dean Kramer
(74) *Attorney, Agent, or Firm* — Norman B. Thot

(57) ABSTRACT

A gripping device for tubular elements includes two gripping arms arranged opposite to each other which together forming an opening having a diameter, transfer elements, at least one piston rod connected to the two gripping arms via the transfer elements, at least one cylinder in which the at least one piston rod is configured to run, a stop device connected to the at least one piston rod, and an adjustment system configured to limit an axial movement of the stop device and thereby the diameter of the opening. The stop device is configured to cooperate with the adjustment system.

18 Claims, 9 Drawing Sheets

(56) References Cited

U.S. PATENT DOCUMENTS

| | | | | |
|---|---|---|---|---|
| 5,588,688 | A * | 12/1996 | Jacobsen | A61F 2/588 |
| | | | | 294/106 |
| 5,967,581 | A * | 10/1999 | Bertini | B25J 15/028 |
| | | | | 294/119.1 |
| 6,575,512 | B2 * | 6/2003 | Moilanen | B25B 5/087 |
| | | | | 269/32 |
| 9,175,527 | B2 * | 11/2015 | McIntosh | E21B 19/06 |
| 2004/0217612 | A1 | 11/2004 | Slettedal | |
| 2008/0060850 | A1 | 3/2008 | Stanton et al. | |
| 2011/0148133 | A1 | 6/2011 | Hessels et al. | |
| 2012/0097454 | A1 | 4/2012 | Kockeis et al. | |
| 2012/0146353 | A1 | 6/2012 | Lunde | |

* cited by examiner

GRIPPING DEVICE WITH ADJUSTABLE DIAMETER AND METHOD OF OPERATING

CROSS REFERENCE TO PRIOR APPLICATIONS

This application is a U.S. National Phase application under 35 U.S.C. §371 of International Application No. PCT/EP2014/060341, filed on May 20, 2014 and which claims benefit to Norwegian Patent Application No. 20130726, filed on May 24, 2013. The International Application was published in English on Nov. 27, 2014 as WO 2014/187823 A2 under PCT Article 21(2).

FIELD

The present invention relates to a gripping device for tubular elements, and to a method for adjusting the diameter formed by the gripping device.

BACKGROUND

Pipe handling apparatuses are currently used in a number of applications. A gripping device as described herein is particularly useful on a platform deck, both onshore and offshore, for handling different pipes. Pipe handling apparatuses are normally used for a number of purposes on a platform deck, including:
- moving pipes form one location to another on the deck, for example, from a storage location to a pipe assembly location or fingerboard;
- lifting pipes from a horizontal storage position into a vertical position for screwing together with other pipes; and
- holding pipes both horizontally and vertically.

Previously described solutions exist, for example, in U.S. Pat. No. 2,964,020, US 2011/0148133 A1, and WO 02/074495 A1.

U.S. Pat. No. 2,964,020 describes a device for adjusting piston stroke in a power-driven drilling assembly. The piston stroke can be adjusted by rotating a nut relative to a shaft. The extent of the piston stroke is determined by the spacing between the nut and a sleeve fastened to the shaft. The stroke of the piston is reduced if the spacing between the nut and the sleeve is reduced.

US 2011/0148133 A1 describes a gripping assembly for handling pipes. The gripping assembly consists of two gripping members which are brought into gripping engagement with the outer circumference of a pipe. The opening of the gripping members or the distance between the gripping members defines the size of the gripping opening and is adjusted by a locking body. The locking body has a diameter that varies along the length of the locking body. The size of the gripping opening is determined by choosing the diameter that is to be brought into engagement between the two gripping members. A cylindrical piston is used to move the locking body relative to the gripping members to select diameter. The diameters at which the gripping members can work are given by the step wedge that is mounted in the gripping assembly. The gripping members stop against the diameter of the pipe around which they are gripping, which corresponds to one of the surfaces and the bevel edge.

WO 02/074495 A1 described a gripping claw for tubular goods comprising two, with respect to each other, pivotable jaws, and a working cylinder which causes a movement of the pivotable jaws with respect to a stationary housing. A counter block is arranged between the pivotable jaws in the housing. Each pivotable jaw is movably arranged with respect to the counter block by a forced motion. The movable forced motion causes an axial back and forth displacement which is simultaneous with the opening/closing of the pivotable jaws. The working cylinder is connected to each pivotable jaw via an articulated connection, thereby forming a pivot axis for the pivotable jaws.

A disadvantage of the solutions described in the prior art is a difficulty to quickly adjust the diameter of the jaws or gripping arms between different pipe diameters.

SUMMARY

An aspect of the present invention is to provide a remedy for at least one of the disadvantages associated with the prior art. An aspect of the present invention is in particular to provide a system for quickly adjusting the diameter of the gripping device.

In an embodiment, the present invention provides a gripping device for tubular elements which includes two gripping arms arranged opposite to each other which together forming an opening having a diameter, transfer elements, at least one piston rod connected to the two gripping arms via the transfer elements, at least one cylinder in which the at least one piston rod is configured to run, a stop device connected to the at least one piston rod, and an adjustment system configured to limit an axial movement of the stop device and thereby the diameter of the opening. The stop device is configured to cooperate with the adjustment system.

BRIEF DESCRIPTION OF THE DRAWINGS

The present invention is described in greater detail below on the basis of embodiments and of the drawings in which.

DETAILED DESCRIPTION

Figure 1:
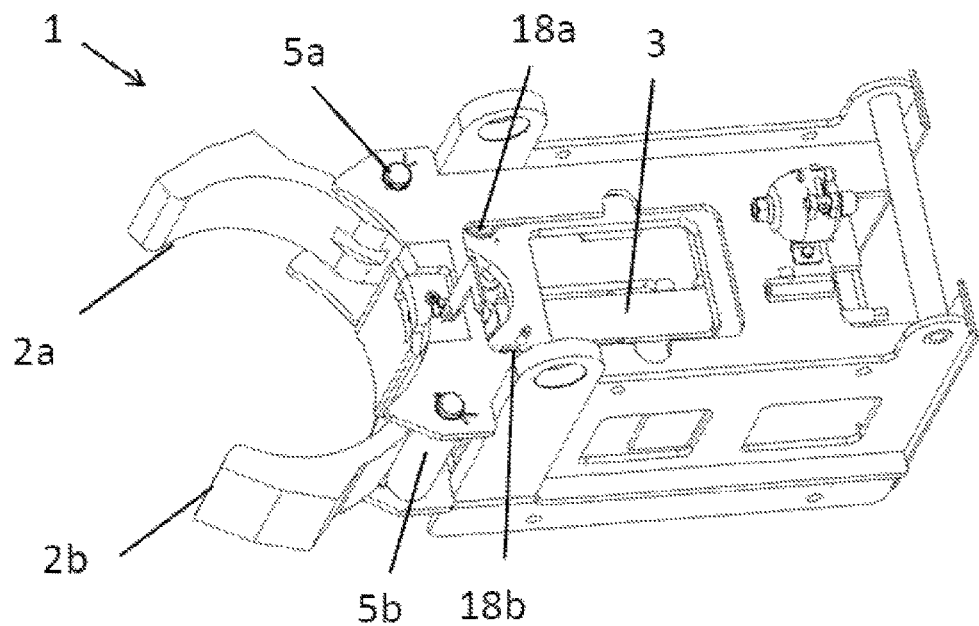
FIG. 1 shows an embodiment of a gripping device according to the present invention.

In an embodiment, the present invention limits the stroke of the piston rod by using an adjustable adjusting screw.

In an embodiment, the present invention provides a gripping device for tubular elements, comprising:
- two gripping arms arranged opposite each another, the gripping arms together forming an opening of a given diameter;
- at least one piston rod to which the two gripping arms, via transfer elements, are connected;
- at least one cylinder in which the piston rod runs; and
- a stop device connected to the piston rod, wherein, the stop device cooperates with an adjustment system, which adjustment system limits the axial movement of the stop device and thereby the diameter of the opening.

The present invention provides a gripping device that allows tubular elements to rotate freely, and also permits the tubular element to be freely raised and lowered without the tubular element falling out of the gripping device. This is achieved by the stop device which provides that the gripping arms, when they grip around a pipe, stop their movement in towards the pipe just before they grip around the pipe. There is further no squeezing/clamping around the pipe, but instead a lifting under a collar on the pipe.

In an embodiment, the present invention provides a gripping device where the minimum diameter formed by the gripping arms can be determined/limited.

In an embodiment of the gripping device of the present invention, the transfer elements can, for example, comprise a housing to which housing the piston rod is secured by fastening devices at a first end of the housing, and where the housing, at its second end, opposite the first end, is rotatably connected, via pins, to the two respective gripping arms.

In an embodiment of the present invention, the adjustment system can, for example, comprise at least one adjustment sleeve with an end face, which adjustment sleeve is threaded on the inside.

In an embodiment of the present invention, the adjustment system further comprises at least one adjusting screw provided with threads on the outside which cooperate with the threads on the inside of the at least one adjustment sleeve.

In an embodiment of the present invention, the end face of the adjustment sleeve can, for example, limit the axial movement of the stop device.

In an embodiment of the present invention, the gripping device comprises a load indicator that is designed to prevent the gripping device from inadvertently being opened if there is a load in the gripping device.

In an embodiment of the present invention, a proximity sensor can, for example, be connected in connection with the load indicator to detect load in the gripping device.

In an embodiment of the present invention, a first proximity sensor can, for example, be arranged to provide a signal on detection of load to prevent the gripping device from inadvertently being opened.

In an embodiment of the present invention, a second proximity sensor can, for example, be arranged to detect a load in the gripping device and to transmit a signal that the gripping arms can be closed.

The present invention further relates to a method for adjusting the diameter of an opening that is formed by at least two gripping arms in a gripping device as described above. The gripping device comprises at least one piston rod to which the two gripping arms, via transfer elements, are connected, at least one cylinder in which the piston rod runs, and a stop device connected to the piston rod, wherein the method comprises the step of rotating an adjustment system, which adjustment system limits the axial movement of the stop device to thereby adjust the diameter of the opening formed by the gripping arms.

A non-limiting embodiment of the present invention will now be described with reference to the accompanying drawings in which like parts have been given like reference numerals.

FIG. 1 shows a gripping device 1 with gripping arms 2a, 2b that are adjusted so that the gripping arms 2a, 2b adapt to grip pipes of different pipe diameters. The gripping arms 2a, 2b are adjusted in response to the movement of a piston rod 4 in a cylinder 3, as is seen in FIG. 2.

Figure 2:
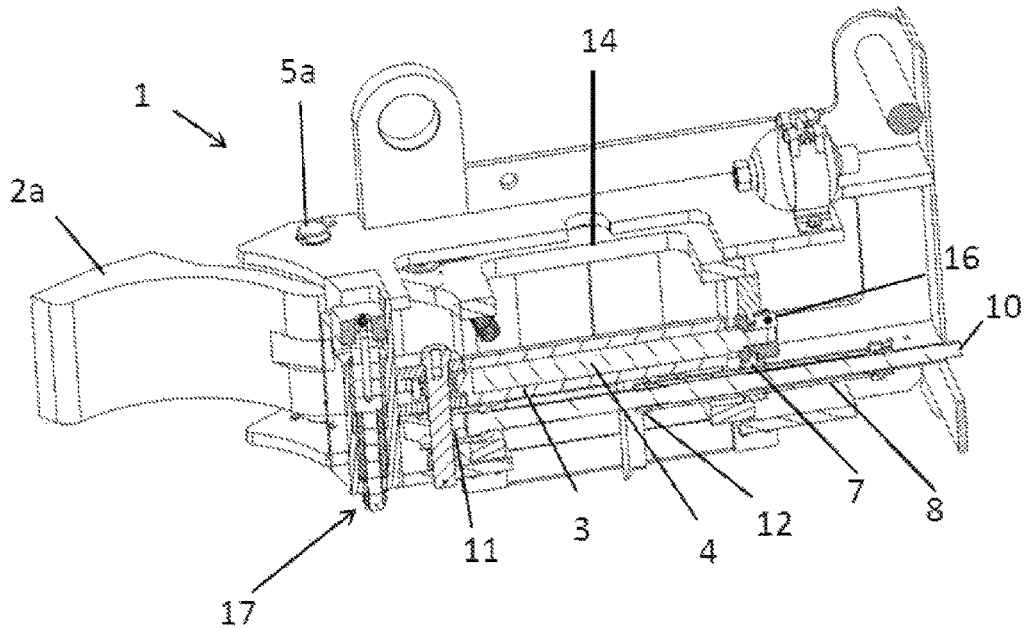
FIG. 2 shows an axial section through the gripping device in FIG. 1.
Figure 4:
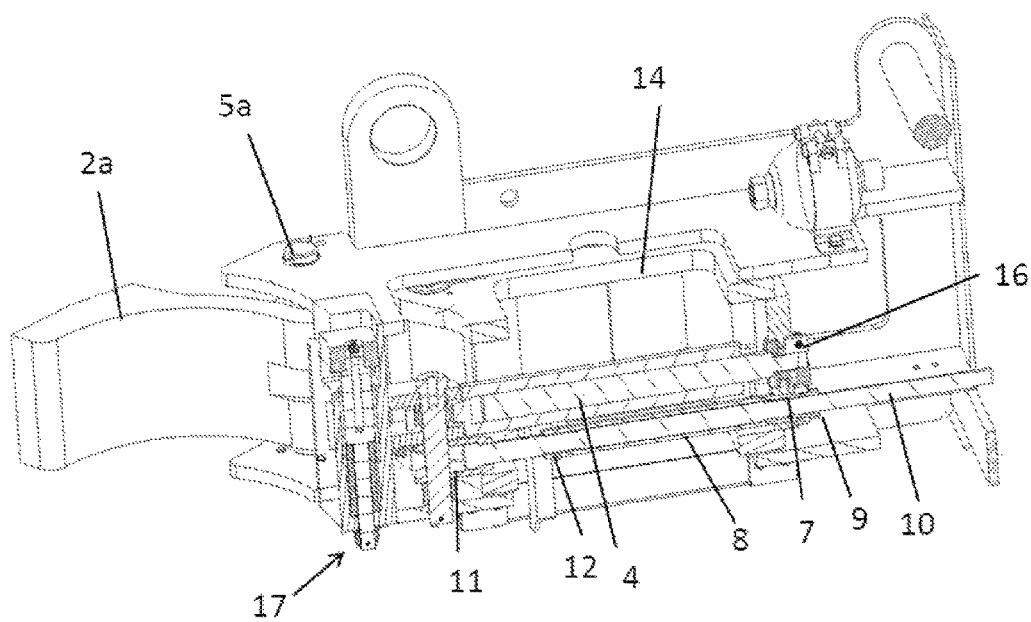
FIG. 4 shows details around a piston rod and a cylinder when the gripping arms form the largest possible minimum diameter.
Figure 7:
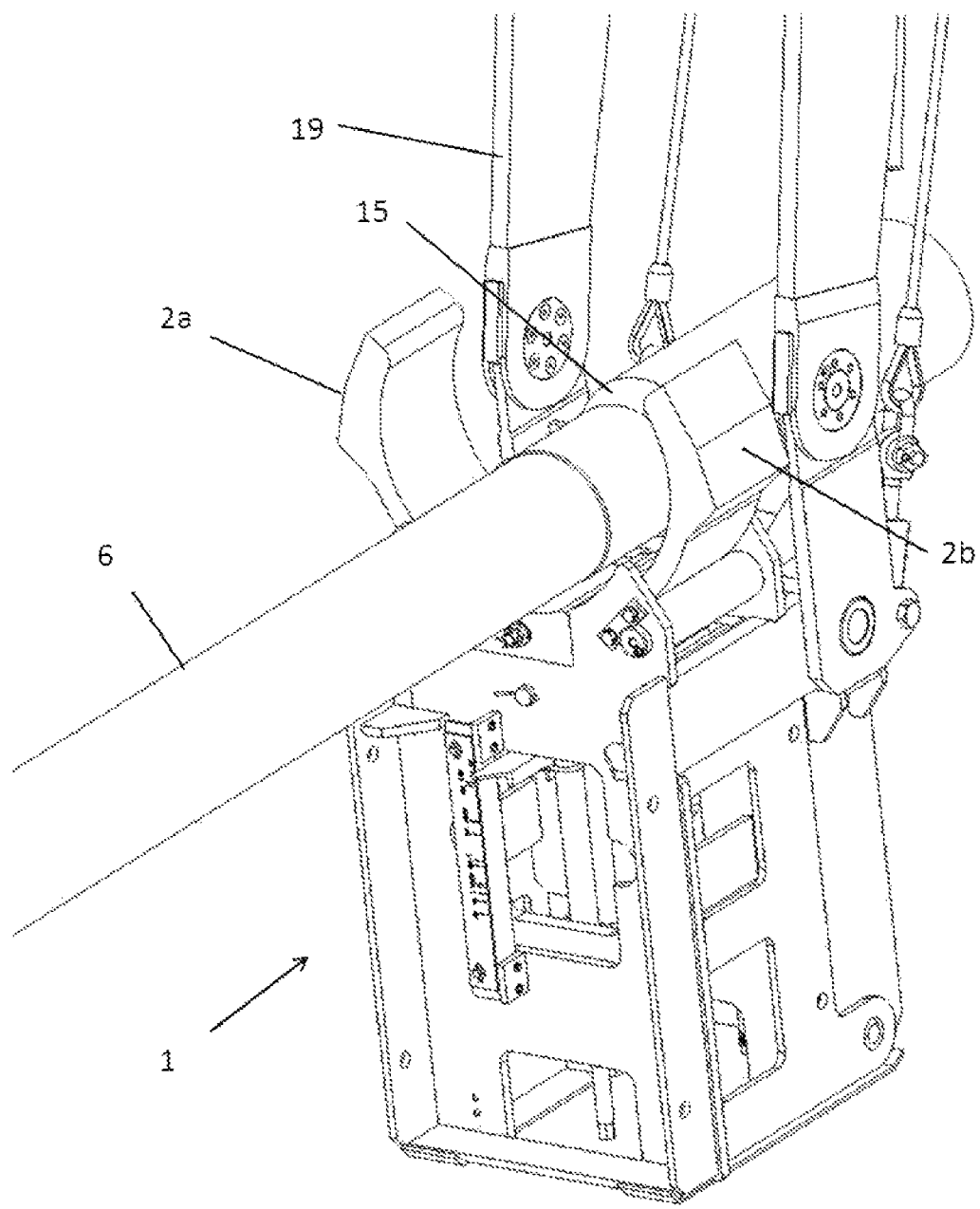
FIG. 7 shows the gripping device connected to a lifting arm when it is to lift a pipe from a horizontal position into a vertical position.

FIG. 2 shows an axial section through the gripping device 1 in FIG. 1 and shows the connection between the piston rod 4 and the gripping arms 2a, 2b via transfer elements. The transfer elements comprise a housing 14, to which housing 14 the piston rod 4 is secured by fastening devices 16 at a first end of the housing 14. The connection between the housing 14 and the piston rod 4 is such that the housing 14 will follow all axial movement of the piston rod 4. The housing 14, at its second end, is rotatably connected via pins 18a, 18b to the two gripping arms 2a, 2b, respectively. The housing 14 and the gripping arms 2a, 2b, like the housing 14 and the piston rod 4, are arranged with a connection that causes the gripping arms 2a, 2b to follow the axial movement of the housing 14. Two counter bolts 5a, 5b are also provided, which are shown in the illustrated exemplary embodiment in the drawings as counter rolls, which are connected to the outer wall surrounding the gripping device 1. The counter bolts 5a, 5b press the gripping arms 2a, 2b inwards when the piston rod 4 is pressed outwards due to the outer sides of the gripping arms 2a, 2b being in abutment with the counter bolts 5a, 5b. The gripping arms 2a, 2b are in the idle position (or are inactive) when they have their largest opening (as shown in FIGS. 4 and 7), or put another way: the cylinder has a zero stroke. This arrangement provides that the gripping arms 2a, 2b have a synchronized movement so that they always form a circular shape/diameter upon movement with respect to the housing 14, i.e., the gripping arms 2a, 2b are mirrored about an imaginary center axis running in the longitudinal direction of the housing 14. The arrangement described above functions so that a movement of the piston rod 4 is transferred via the housing 14 to the gripping arms 2a, 2b. The piston rod 4 thereby controls how large/small a diameter the gripping arms 2a, 2b are able to form.

The gripping arms 2a, 2b in FIGS. 1 and 2 form a relatively large diameter opening. When the piston rod 4 is suitably pressed out of the cylinder 3 into the position shown in FIG. 3, the gripping arms 2a, 2b are moved to a diameter in which they fit around a selected pipe diameter, as illustrated by pipe 6. The diameter of the pipe 6 in FIG. 3 is smaller than the diameter of the pipes that can be lifted by the gripping device 1 as shown in FIGS. 1 and 2.

Figure 3:
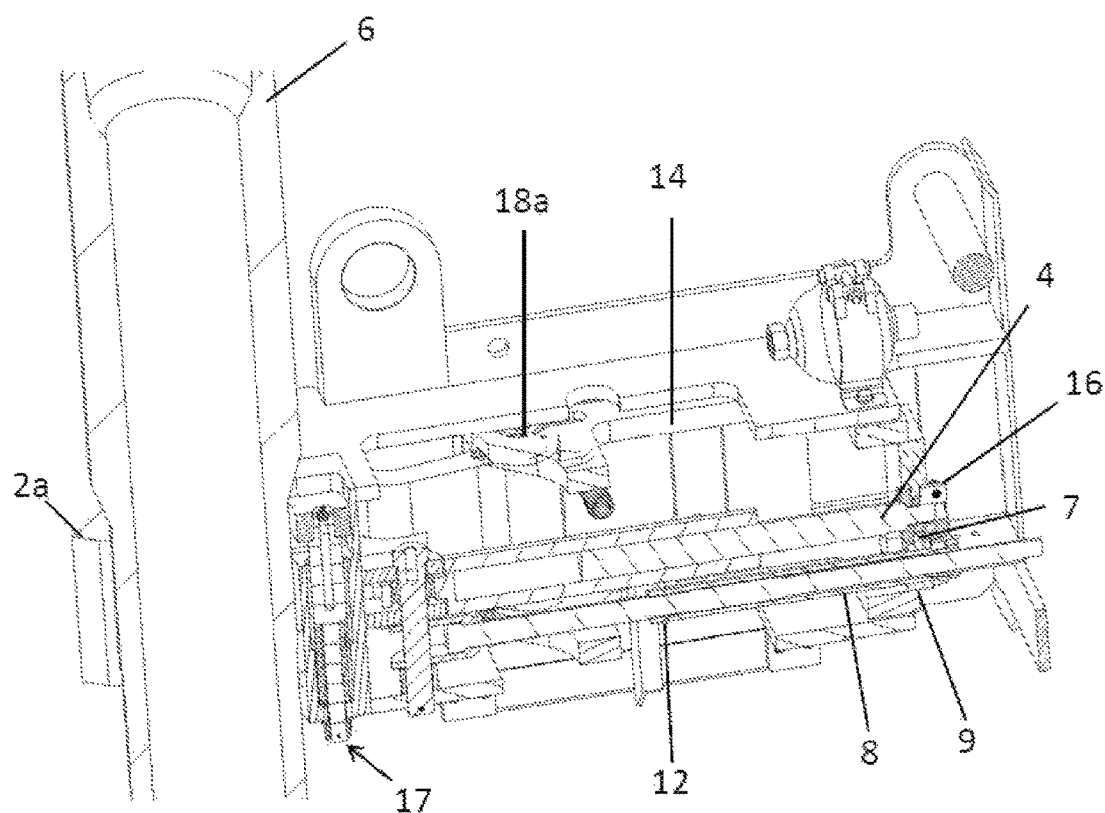
FIG. 3 shows the gripping device when holding around a pipe.

FIGS. 2 and 3 show that the piston rod 4 is attached to a stop device 7, for example, a stop ring. The stop device 7 limits the stroke of the piston rod 4 in that the stop device 7 is moved to an end stop against an end face 9 that is formed in an adjustment sleeve 8. FIG. 3 shows the stop device 7 in end stop against the end face 9. Due to end face 9 limiting the stroke of the stop device 7 (and thus the piston rod 4), the diameter formed by the gripping arms 2a, 2b is also determined. The invention will be capable of being used to handle pipes of different diameter, and by arranging the adjustment sleeve 8 (with the end face 9) so as to be movable, the stroke of the piston rod 4 can be determined, and thereby the diameter that the gripping arms 2a, 2b are to form.

The adjustment sleeve 8 is moved via an adjusting screw 10, which is supported in a mounting ring 11, rotates with threads that cooperate with threads in the adjustment sleeve 8. Rotation of the adjusting screw 10 causes the adjustment sleeve 8 to move as can be seen by comparing FIGS. 3 and 4. The end face 9, by which the axial movement of the stop device 7 is limited, is thereby also moved so that the minimum diameter the gripping arms 2a, 2b are able to form can be adjusted to be larger or smaller depending on the diameter of the pipes that are to be lifted. The interface of the adjusting screw 10 is such that the adjusting screw 10 can easily be manipulated by screw devices known to those of skill in the art. The adjusting screw 10 can, in an embodiment, for example, be hexagonal at the end so that any screw tool can be used to rotate the screw, for example, a pneumatic nut driver with a suitable socket.

FIG. 4 shows details around the piston rod 4 and the cylinder 3 in which the piston rod 4 runs where the gripping arms 2a, 2b form the largest possible minimum diameter. FIG. 4 shows that the piston rod 4 in this position of the adjustment sleeve 8, and thus the end face 9, is permitted a more limited piston stroke, and thus another diameter than is the case for the position of the adjustment sleeve 8 as shown in FIG. 3.

Figure 5:
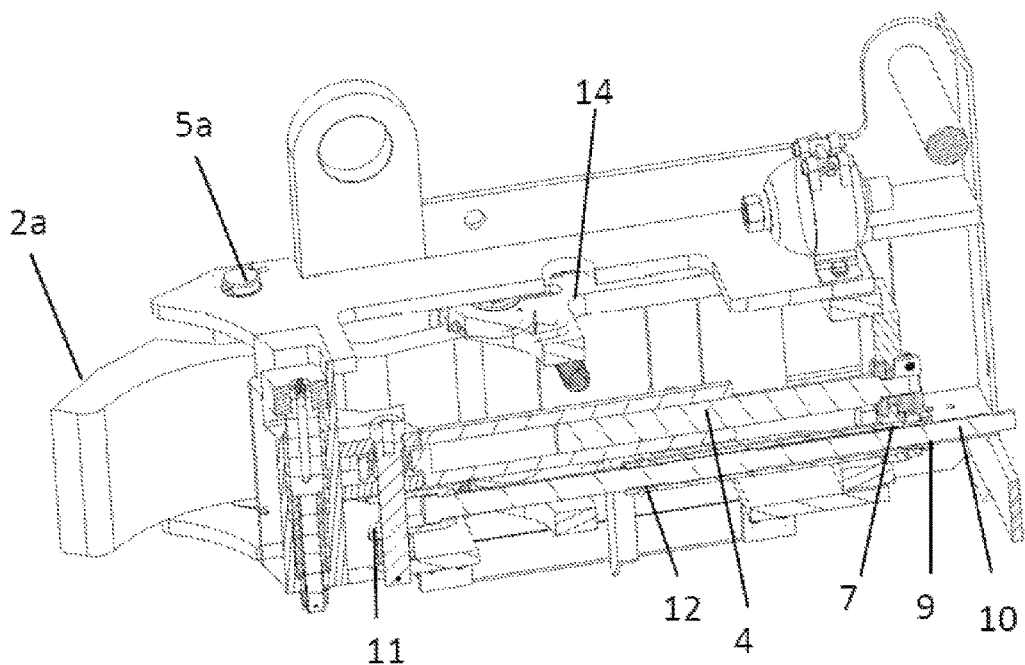
FIG. 5 shows details around a piston rod and a cylinder when the gripping arms form an outer diameter of 6⅝"

FIG. 5 shows details around the piston rod 4 and the cylinder 3 when the gripping arms 2a, 2b form a diameter of 6⅝".

Figure 6:
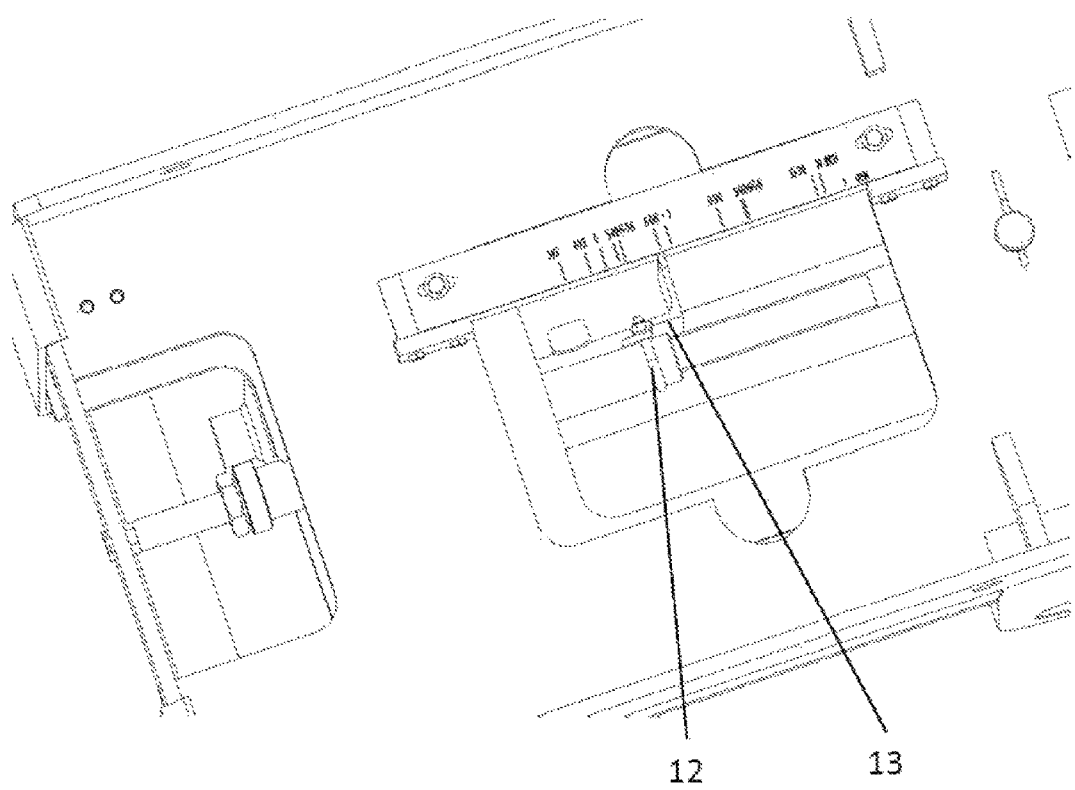
FIG. 6 shows an embodiment of the gripping device equipped with an indicator showing the selected diameter to be formed by the gripping arms.

FIG. 6 shows an embodiment of the gripping device 1 equipped with an indicator 13 showing the smallest selected diameter of the gripping arms 2a, 2b. The indicator 13 is also illustrated in the other figures by bolt 12 for attachment of the indicator 13. The indicator 13 is connected to the adjusting screw 10 in a known manner so that, by adjusting the adjusting screw 10, an illustrative indication is obtained of the change to the largest possible minimum diameter of the gripping arms 2a, 2b on the indicator 13. The illustrated pipe diameters on the indicator 13 are normally selected to show the most commonly used pipe diameters, such as 3½", 5", 6⅝", 9⅜", 9½" and 13⅜" pipes.

FIG. 7 shows the gripping device 1 mounted on a lifting arm 19 when it is to lift a pipe 6 from a horizontal position into a vertical position. The gripping arms 2a, 2b are moved into a gripping position around the pipe 6. When the pipe 6 is lifted into the vertical position, the pipe shoulder 15 rests on the gripping arms 2a, 2b. The gripping device 1 may comprise a load indicator 17 which transmits a signal that the gripping arms 2a, 2b are subjected to a load so that the gripping arms 2a, 2b are not inadvertently opened if a load, such as a pipe 6, is placed in the gripping arms 2a, 2b.

Figure 8:
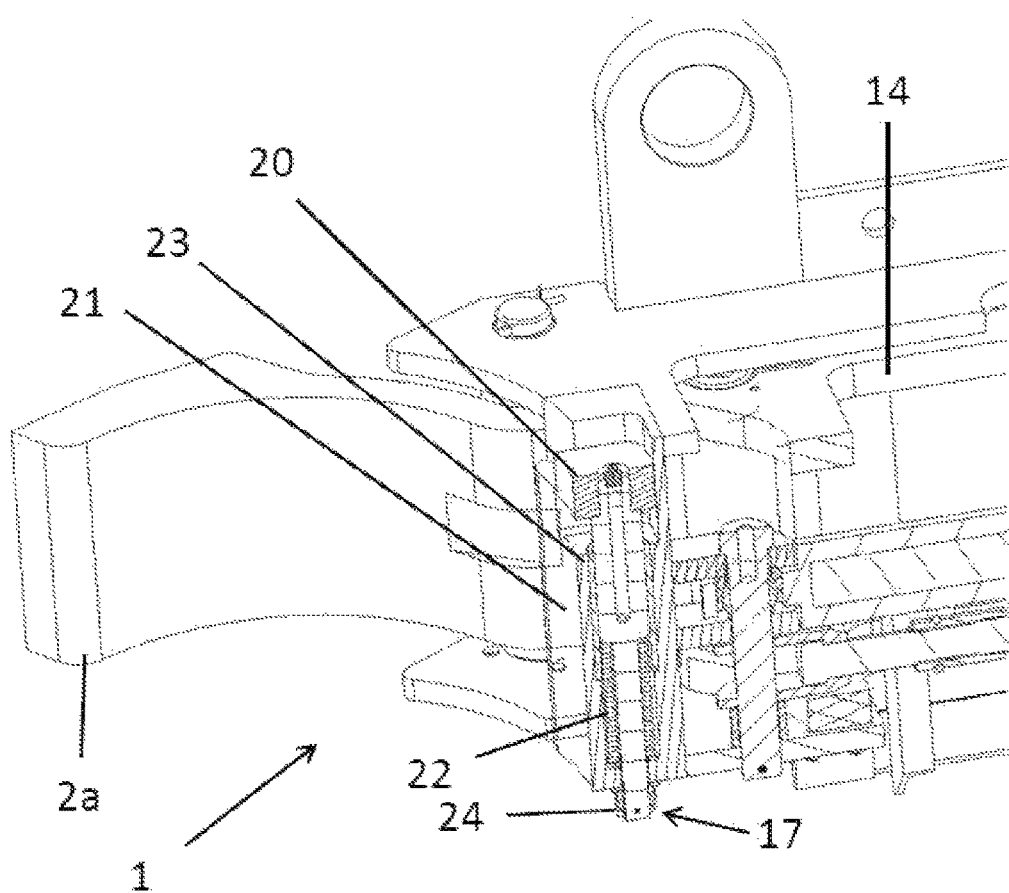
FIG. 8 shows an embodiment of a gripping device with a load indicator where the gripping device is in an unloaded position.
Figure 9:
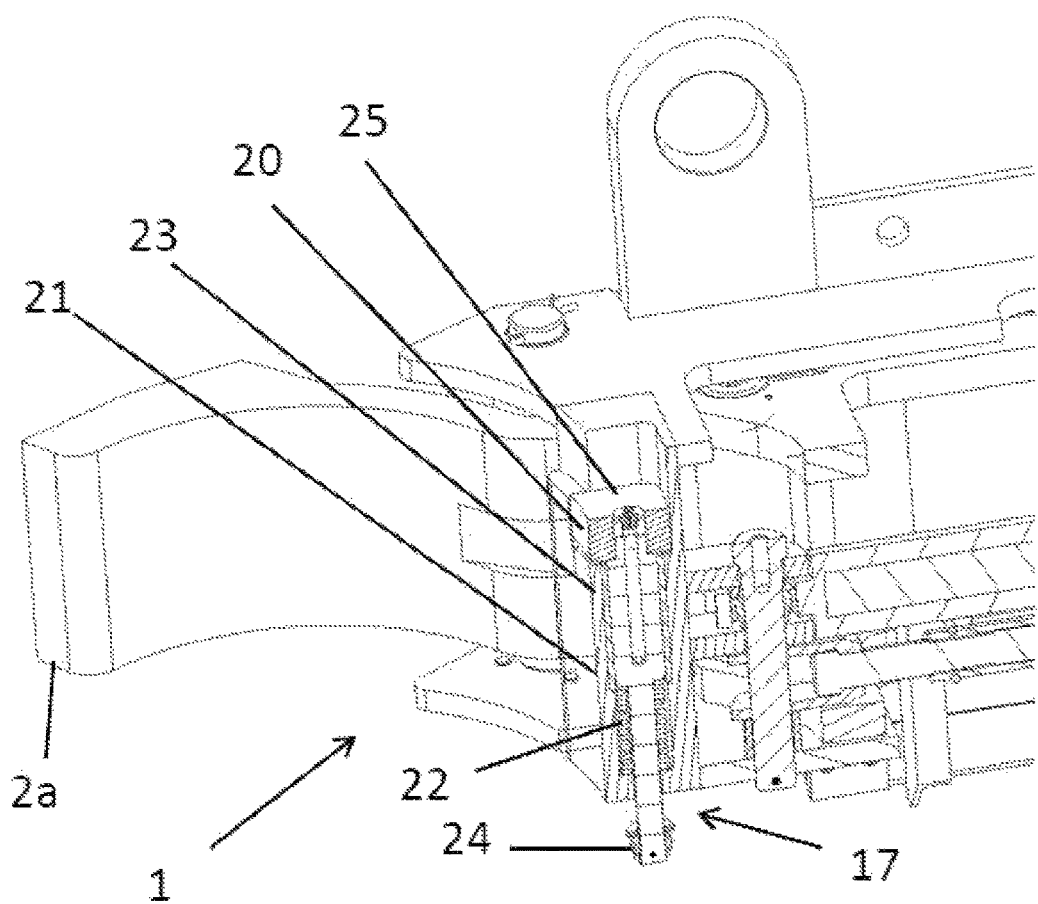
FIG. 9 shows an embodiment of a gripping device with a load indicator where the gripping device is in a loaded position.

FIG. 8 shows an embodiment of a gripping device 1 with a load indicator 17 where the gripping device 1 grips around a pipe (not shown), while FIG. 9 shows an embodiment of a gripping device 1 with a load indicator 17 where the load indicator 17 is shown in a position in which the gripping device 1 grips around a pipe. The load indicator 17 comprises a load indicator bolt 20 that runs in an outer housing 21. The load indicator bolt 20 is mounted in the outer housing 21 with a spring 22. A pretensioning nut 24 is arranged in connection with the load indicator bolt 20 in order to be able to adjust the resistance the spring 22 is able to exert against movement of the load indicator bolt 20 in the outer housing 21. A bearing lining 23 is arranged on the inside of the outer housing 21 against the load indicator bolt 20 and the spring 22.

Figure 10:
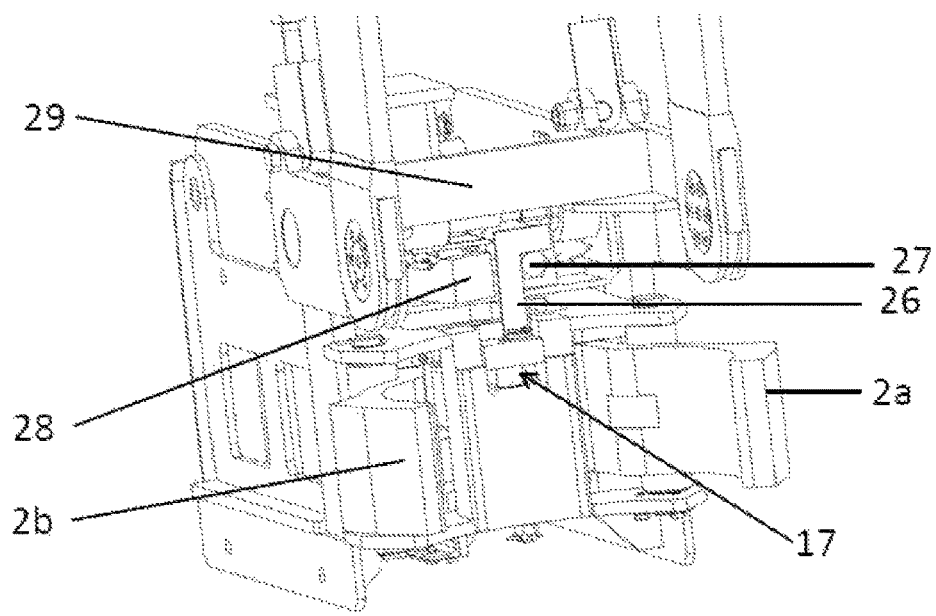
FIG. 10 shows the mechanism that prevents the gripping arms from inadvertently being opened.

FIG. 9 shows an embodiment of a gripping device 1 with a load indicator 17, where the gripping device 1 has a load, i.e., is in a position in which the gripping device 1 is holding a pipe (not shown). The load indicator bolt 20 may have an upper surface 25 against which the load rests. If the gripping device 1 has a load, the load will press down on the upper surface 25 of the load indicator bolt 20, and press the load indicator bolt 20 against the spring 22. This can be seen clearly by comparing the position of the load indicator bolt 20 relative to the outer housing 21 in FIGS. 8 and 9, respectively. FIG. 10 shows details of the mechanism that prevents the gripping arms 2a, 2b from inadvertently being opened.

The load indicator 17 has an L-shaped flag 26 on the top. When the load indicator 17 is pressed down by a pipe that is being lifted, the L-shaped flag 26 will trigger a first proximity sensor 27 that gives an electrical signal to the control system. While a load is being lifted, the control system will prevent a signal from being sent to the cylinder valve 3 to open. Even if someone pulls on a control lever, nothing will happen before the load has been put down, for example, onto a drill floor. There is further provided a second proximity sensor 28 which indicates that there is a pipe in position and which provides a signal that the gripping arms 2a, 2b can be closed.

Figure 11:
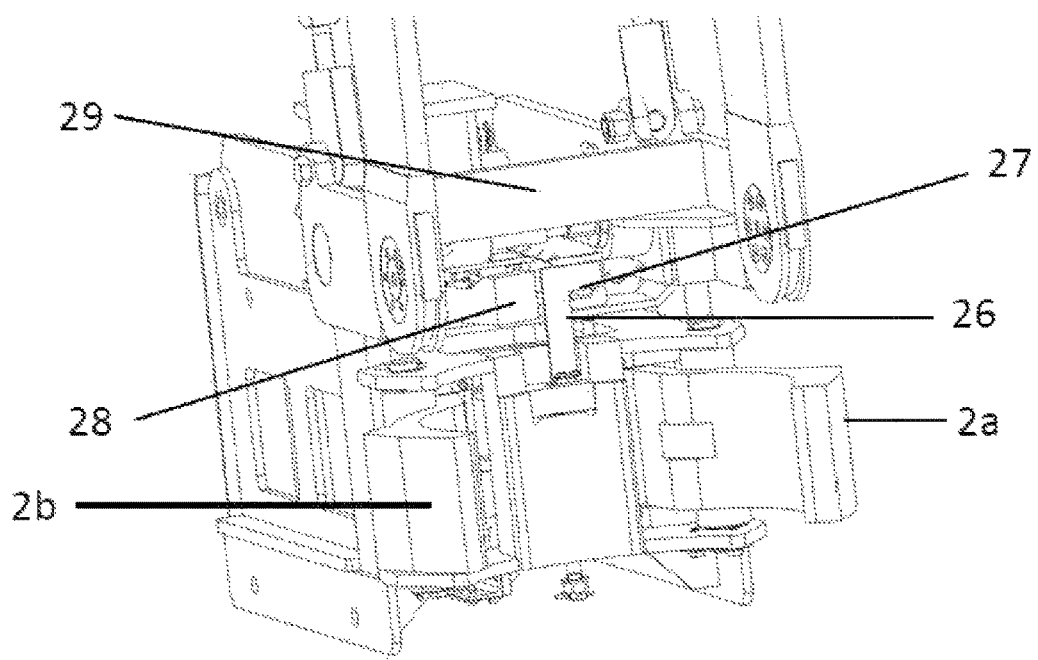
FIG. 11 shows details of a situation with a load in the gripping device.
Figure 12:
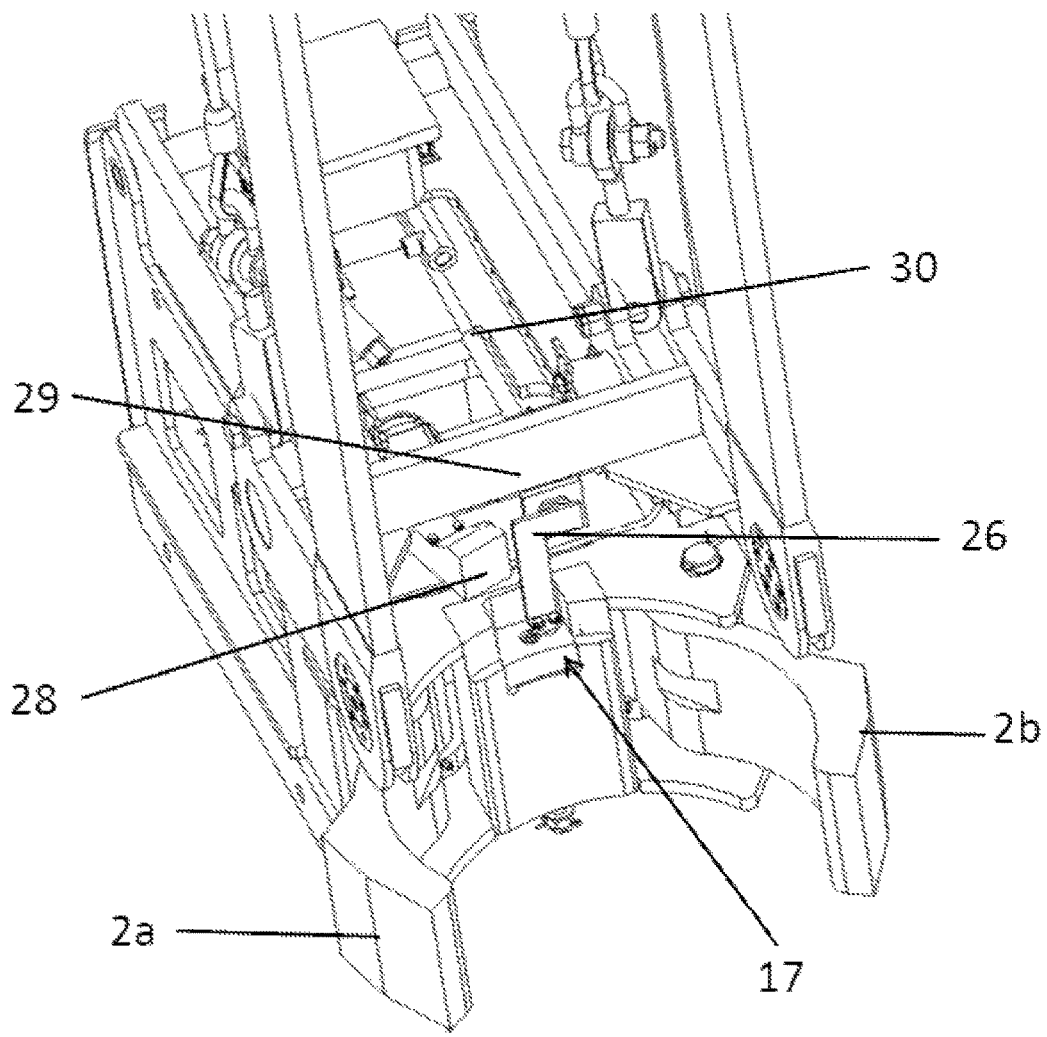
FIG. 12 shows details of a situation with a load in the gripping device.

FIG. 10 shows a situation without any load, while FIGS. 11 and 12 show a situation with a load, and where the L-shaped flag 26 covers the first proximity sensor 27 so that the gripping arms 2a, 2b are prevented from being opened.

A stroke sensor 30 (FIG. 12) may be provided between the lifting head and a tilt bracket 29 which indicates the stroke of the cylinder 3.

The use of the embodiment described above provides a system for adjusting the diameter of a gripping device, and a method for adjusting the opening formed by the gripping arms of the gripping device.

The embodiment described herein is only meant as an illustration and should not be considered to be limiting. It should be clear that a person of skill in the art will be able to make modifications or changes to the present invention without departing from the scope of the present invention as defined in the attached claims. It is, for example, possible to arrange the piston rod 4 with accompanying cylinder 3 so that the piston rod 4 acts directly on the gripping arms 2a, 2b, and with the cylinder 3 attached to the housing 14 so that it is the axial movement of the cylinder 3 that is controlled by the end face 9 of the adjustment sleeve 8 instead of the axial movement of the piston rod 3. Although the embodiment described herein has two gripping arms 2a, 2b, the gripping device 1 in other embodiments may, if appropriate, comprise a larger number of gripping arms, such as, for example, three, four, five, etc. gripping arms. Reference should be had to the appended claims.

The invention claimed is:

1. A gripping device for tubular elements, the gripping device comprising:
   two gripping arms arranged opposite to each other, the two gripping arms together forming an opening having a diameter;
   transfer elements;
   at least one piston rod connected to the two gripping arms via the transfer elements;
   at least one cylinder in which the at least one piston rod is configured to run;
   a stop device connected to the at least one piston rod;
   an adjustment system configured to limit an axial movement of the stop device and thereby the diameter of the opening;
   fastening elements; and
   pins,
   wherein, the stop device is configured to cooperate with the adjustment system, the transfer elements comprise a housing comprising a first housing end and a second housing end which is arranged opposite to the first housing end, the at least one piston rod is mounted to the housing via the fastening elements at the first housing end, and the housing is rotatably connected to each of the two gripping arms at the second housing end via the pins.

2. The gripping device as recited in claim 1, wherein the adjustment system comprises at least one adjustment sleeve comprising an end face, an inside of the at least one adjustment sleeve comprising threads.

3. The gripping device as recited in claim 2, wherein the adjustment system further comprises at least one adjusting screw, an outside of the at least one adjusting screw comprising threads which cooperate with the threads on the inside of the at least one adjustment sleeve.

4. The gripping device as recited in claim 2, wherein the at least one adjustment sleeve further comprises an end face which is configured to limit the axial movement of the stop device.

5. The gripping device as recited in claim 1, further comprising a load indicator configured to prevent the gripping device from inadvertently being opened.

6. The gripping device as recited in claim 5, further comprising at least one proximity sensor which is arranged in connection with the load indicator to detect a load in the gripping device.

7. The gripping device as recited in claim 6, wherein the at least one proximity sensor comprises a first proximity sensor configured to detect the load in the gripping device and to provide a signal to prevent the gripping device from inadvertently being opened.

8. The gripping device as recited in claim 6, wherein the at least one proximity sensor comprises a second proximity sensor configured to detect the load in the gripping device and to transmit a signal that the gripping arms can be closed.

9. A gripping device for tubular elements, the gripping device comprising:
two gripping arms arranged opposite to each other, the two gripping arms together forming an opening having a diameter;
transfer elements;
at least one piston rod connected to the two gripping arms via the transfer elements;
at least one cylinder in which the at least one piston rod is configured to run;
a stop device connected to the at least one piston rod; and
an adjustment system configured to limit an axial movement of the stop device and thereby the diameter of the opening,
wherein,
the stop device is configured to cooperate with the adjustment system, and
the adjustment system comprises at least one adjustment sleeve comprising an end face, an inside of the at least one adjustment sleeve comprising threads.

10. The gripping device as recited in claim 9, further comprising:
fastening elements; and
pins,
wherein,
the transfer elements comprise a housing comprising a first housing end and a second housing end which is arranged opposite to the first housing end,
the at least one piston rod is mounted to the housing via the fastening elements at the first housing end, and
the housing is rotatably connected to each of the two gripping arms at the second housing end via the pins.

11. The gripping device as recited in claim 9, wherein the adjustment system further comprises at least one adjusting screw, an outside of the at least one adjusting screw comprising threads which cooperate with the threads on the inside of the at least one adjustment sleeve.

12. The gripping device as recited in claim 9, wherein the at least one adjustment sleeve further comprises an end face which is configured to limit the axial movement of the stop device.

13. The gripping device as recited in claim 9, further comprising a load indicator configured to prevent the gripping device from inadvertently being opened.

14. The gripping device as recited in claim 13, further comprising at least one proximity sensor which is arranged in connection with the load indicator to detect a load in the gripping device.

15. The gripping device as recited in claim 14, wherein the at least one proximity sensor comprises a first proximity sensor configured to detect the load in the gripping device and to provide a signal to prevent the gripping device from inadvertently being opened.

16. The gripping device as recited in claim 14, wherein the at least one proximity sensor comprises a second proximity sensor configured to detect the load in the gripping device and to transmit a signal that the gripping arms can be closed.

17. A gripping device for tubular elements, the gripping device comprising:
two gripping arms arranged opposite to each other, the two gripping arms together forming an opening having a diameter;
transfer elements;
at least one piston rod connected to the two gripping arms via the transfer elements;
at least one cylinder in which the at least one piston rod is configured to run;
a stop device connected to the at least one piston rod;
an adjustment system configured to limit an axial movement of the stop device and thereby the diameter of the opening;
a load indicator configured to prevent the gripping device from inadvertently being opened; and
at least one proximity sensor which is arranged in connection with the load indicator to detect a load in the gripping device,
wherein,
the stop device is configured to cooperate with the adjustment system, and
the at least one proximity sensor comprises a first proximity sensor configured to detect the load in the gripping device and to provide a signal to prevent the gripping device from inadvertently being opened.

18. The gripping device as recited in claim 17, wherein the at least one proximity sensor comprises a second proximity sensor configured to detect the load in the gripping device and to transmit a signal that the gripping arms can be closed.

* * * * *